United States Patent [19]

Christensen

[11] Patent Number: 4,989,281
[45] Date of Patent: Feb. 5, 1991

[54] ADJUSTABLE BED FOR A TRUCK-TRAILER SYSTEM

[76] Inventor: Daniel L. Christensen, 2 Central Dr., Port Deposit, Md. 21904

[21] Appl. No.: 524,454

[22] Filed: May 16, 1990

[51] Int. Cl.⁵ .................. B62D 25/00; A61G 7/015; B60N 2/02
[52] U.S. Cl. ................................. 5/118; 5/72; 296/190
[58] Field of Search .............. 5/118, 72, 70, 71, 79; 296/190

[56] References Cited

U.S. PATENT DOCUMENTS

| | | | |
|---|---|---|---|
| 806,091 | 12/1905 | Andrews | 5/72 |
| 2,788,529 | 4/1957 | Moritzacky et al. | 5/72 |
| 4,144,601 | 3/1979 | Anderson et al. | 296/190 |
| 4,659,137 | 4/1987 | Chassaing et al. | 296/190 |
| 4,751,755 | 6/1988 | Carey, Jr. et al. | 5/72 |

Primary Examiner—Alexander Grosz
Attorney, Agent, or Firm—Walter G. Finch

[57] ABSTRACT

An adjustable bed system or arrangement is provided for positioning in limited space in a truck-trailer system for ready use by a driver thereof. This bed arrangement consists of a pair of base plates pivotally connected together one of the base plates is fixed in position and the other movable base plate is pivotally mounted to the fixed plate for angular elevation. A second pair of vertically spaced plates is mounted below the angularly positioned plate and the upper plate thereof has a pair of spaced rolls for contact with the undersurface of the angularly positioned plate. A shaft-cylinder arrangement is positioned below each roller between the second pair of vertically arranged spaced plates and each shaft-cylinder arrangement is elevated by a pressurized reservoir or air bag controlled by a control valve coupled to a source of air pressure to elevate the moveable base plate.

4 Claims, 2 Drawing Sheets

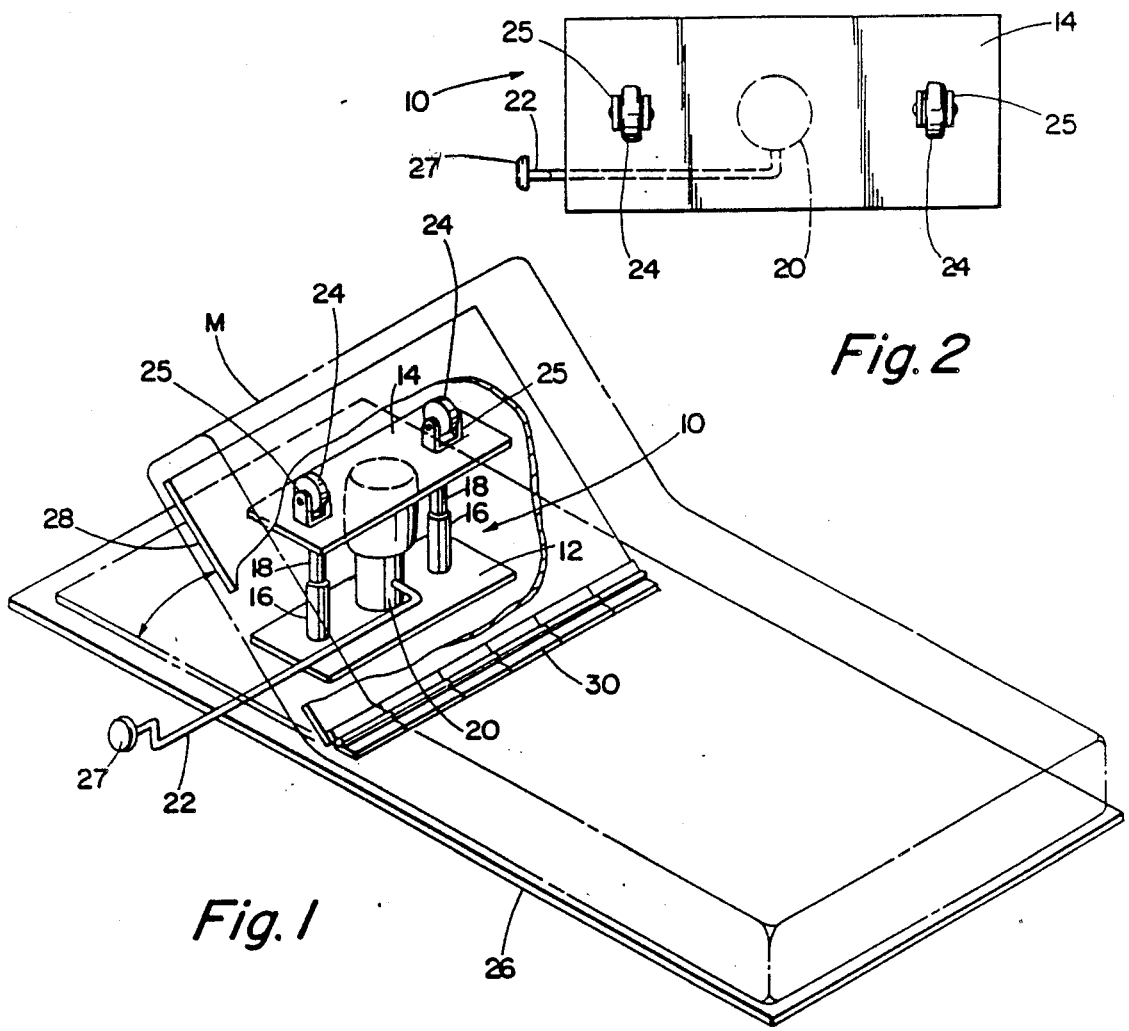
Fig. 2
Fig. 1
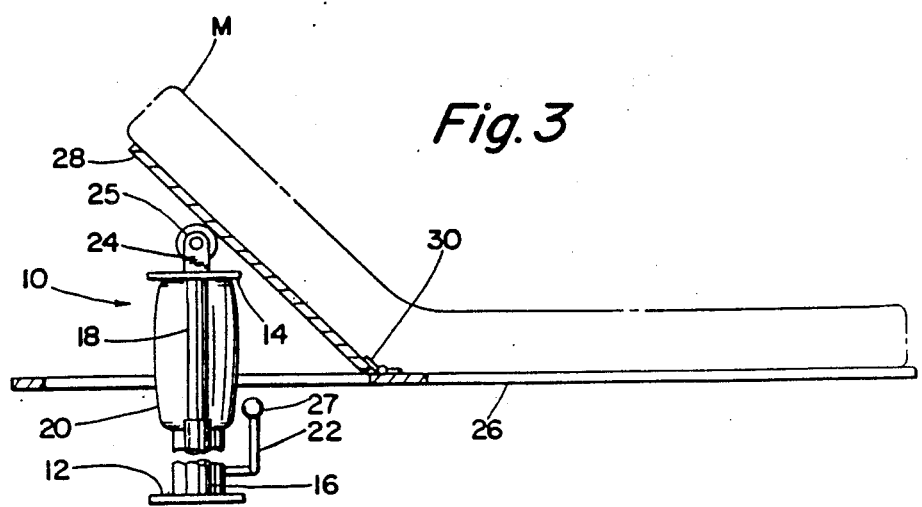
Fig. 3

ADJUSTABLE BED FOR A TRUCK-TRAILER SYSTEM

BACKGROUND AND SUMMARY OF THE INVENTION

This invention relates to bed apparatus, and more particularly to an adjustable bed system for use in transportation equipment, such as truck-trailer arrangements.

BEST KNOWN PRIOR ART

The best known prior art are the following U.S. Pat. Nos.:

| | |
|---|---|
| 2,902,701 | 4,780,919 |
| 3,206,771 | 4,805,249 |
| 3,310,289 | 4,807,313 |
| 3,678,519 | 4,811,435 |
| 3,781,928 | 4,819,282 |
| 3,840,909 | 4,821,350 |
| 4,074,374 | 4,852,193 |
| 4,205,665 | 4,856,128 |
| 4,425,673 | 4,856,129 |
| 4,494,259 | 4,856,741 |
| 4,667,354 | 4,868,937 |
| 4,763,643 | 4,872,226 |
| 4,768,241 | 4,494,259 |

OBJECTS OF THE INVENTION

It is an object of this invention to provide an adjustable bed for a truck-trailer transportation system.

Still other objects of this invention are to provide a unique and novel adjustable bed system for a truck that is economical to manufacture, use to install and which is efficient and reliable in operational use.

To provide an adjustable bed system for a truck trailer transportation system which can be installed in limited space therein is another object of this invention.

And to provide an adjustable bed system for a truck-trailer arrangement that is readily available and in proximity of the driver of the truck-trailer arrangement, is another object of this invention.

BRIEF DESCRIPTION OF THE DRAWINGS

These and other objects and attendant advantages of this invention will become more obvious and apparent from the following detailed specification and accompanying drawings in which:

FIG. 1 is a perspective view of an adjustable bed incorporating features of this invention;

FIG. 2 is a top view of the adjustable bed of FIG. 1;

FIG. 3 is a side view of the adjustable bed of FIG. 1;

DESCRIPTION OF THE PREFERRED EMBODIMENTS OF THE INVENTION

Figure 4:
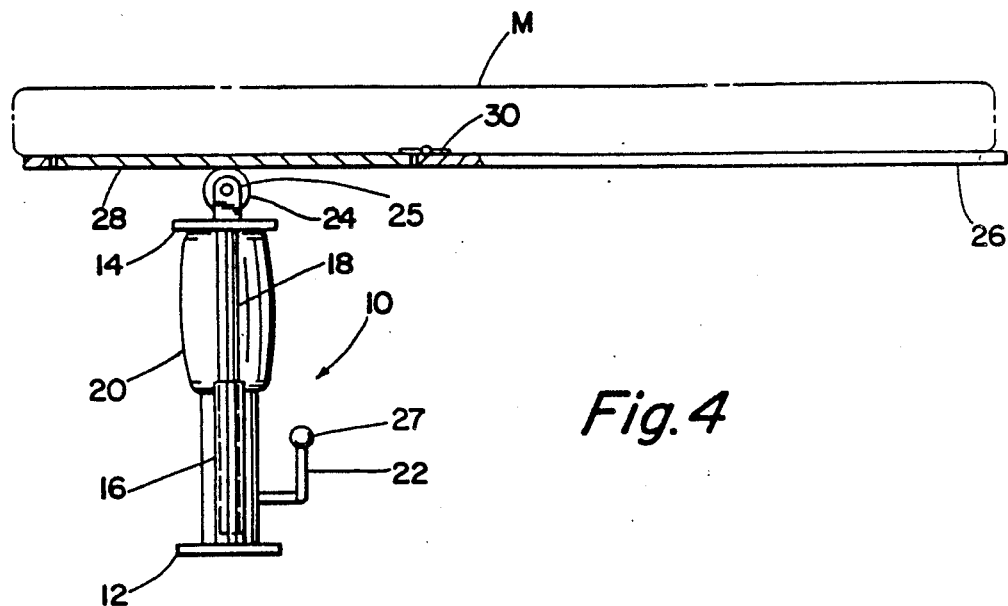
FIG. 4 is a side view of the elevating system for the adjustable bed of FIG. 1.

Referring now to FIGS. 1 to 5, of the drawings, there is shown the preferred embodiment of an adjustable bed or bunk arrangement 10 installed, the limited space provided next to and in proximity with the driver of a truck-trailer transportation system.

This adjustable bed arrangement 10 consists of bases 26 and 28 pivotably connected together by a piano pivot 30. Base 26 is fixed in position while base 28 is arranged to pivot upwardly as will be explained thereafter. A mattress M is positioned on the top of the bases 26 and 28 for a driver to sleep on when the base 28 is inclined to an angular position.

Two spaced steel plate members 12 and 14 are positioned below the base 28 for housing the mechanism for elevating the base 28.

Figure 5:
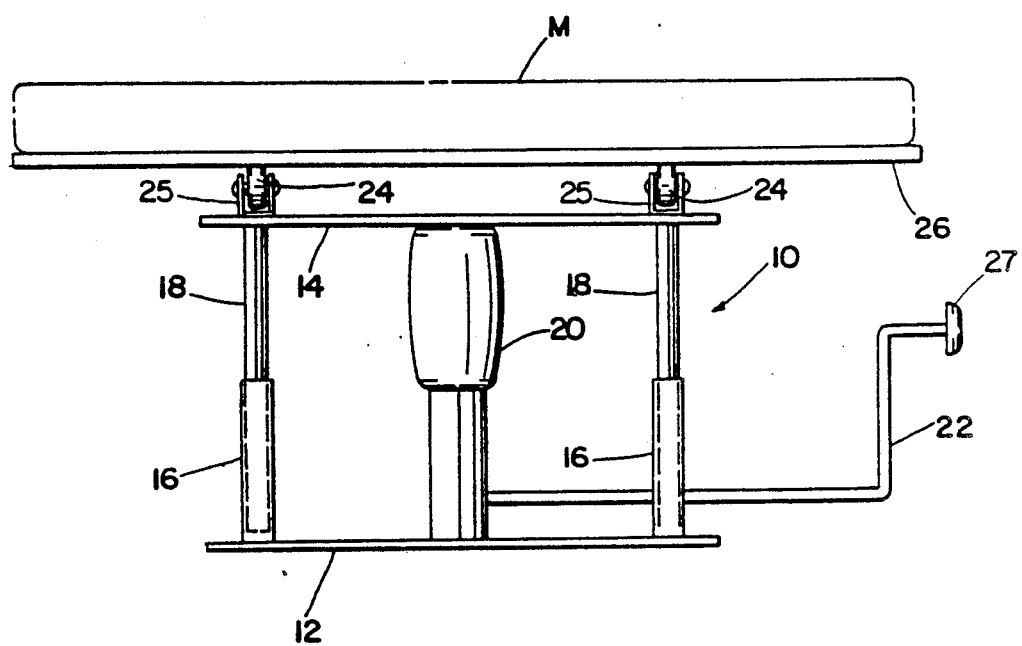
FIG. 5 is a end view of the elevating system for the adjustable bed of FIG. 1.

Two spaced roller wheels 24 are mounted by U-shaped brackets 25 on the top steel plate 14. Directly below each wheel 24 is mounted a cylinder 16 and a shaft 18 positioned in the cylinder 16 for supporting and elevating the vertical plate 14 above the fixed plate 12 so that the steel base 28 can be angularly elevated as desired. The upper ends of the shafts are welded to the underside of 14, all as shown in FIGS. 4 and 5.

As shown in FIGS. 1 to 5, an air bag or air reservoir 20 is positioned between the two plates or bases 12 and 14. This air bag or air reservoir is connected by a passageway 22 to a suitable control valve 27 and a source of pressurized air.

In operational use, the adjustable bed arrangement is put into operational use by controlling the amount of air through the air control valve 27. The air is used to pressurize the bag 20 which causes the upper base 14 to be elevated by the upper movement of the shafts 18 in their respective pistons 16. When this occurs, the wheels 24 roll on the back of the base 28 to cause the base 28 to be angularly elevated to the desired height for a proposed user. When the adjustable bed is no longer to be used, the air is released through the air control valve 27.

Obviously many modifications and variations of the present invention are possible in light of the above teachings. It is, therefore, to be understood that within the scope of the appended claims the invention may be practiced otherwise than as specifically described.

What is claimed is:

1. In combination with a truck-trailer system, an adjustable bed arrangement for use in the limited confinement of a truck-trailer system, comprising, two base members, one of which is fixed and the other movable, means for pivotally coupling said base members together so that one member thereof can be angularly elevated, a pair of vertically arranged spaced members positioned below said base member that can be angularly elevated, the upper of said pair of vertically arranged members having spaced roller members in contact with the undersurface of said member that can be angularly elevated, means positioned between said pair of spaced members for elevating the upper spaced member, and means for applying pressure to said spaced members to cause said rollers to elevate the angularly elevated member.

2. An adjustable bed arrangement for use in the limited confinement of a truck-trailer system as recited in claim 1, wherein the means for pivotally coupling the fixed and moveable base members together consists of a piano hinge.

3. An adjustable bed arrangement for use in the limited confinement of a truck-trailer system as recited in claim 1, wherein the pressure applying means consists of air source reservoir system.

4. An adjustable bed arrangement for use in the limited confinement of a truck-trailer system as recited in claim 1, wherein the pressure applying means consists of a hydraulic system.

* * * * *